US009906618B2

(12) United States Patent
Bergman (10) Patent No.: US 9,906,618 B2
(45) Date of Patent: Feb. 27, 2018

(54) RETURN PATH SELECTION FOR CONTENT DELIVERY

(71) Applicant: Fastly, Inc., San Francisco, CA (US)

(72) Inventor: Artur Bergman, San Francisco, CA (US)

(73) Assignee: Fastly Inc., San Francisco, CA (US)

( * ) Notice: Subject to any disclaimer, the term of this patent is extended or adjusted under 35 U.S.C. 154(b) by 119 days.

(21) Appl. No.: 14/485,236

(22) Filed: Sep. 12, 2014

(65) Prior Publication Data

US 2015/0163318 A1  Jun. 11, 2015

Related U.S. Application Data

(60) Provisional application No. 61/912,914, filed on Dec. 6, 2013.

(51) Int. Cl.
  *H04L 29/08* (2006.01)

(52) U.S. Cl.
  CPC ........ *H04L 67/2842* (2013.01); *H04L 67/101* (2013.01)

(58) Field of Classification Search
  CPC .. H04L 67/2842; H04L 67/101; H04L 47/726
  See application file for complete search history.

(56) References Cited

U.S. PATENT DOCUMENTS

| | | | |
|---|---|---|---|
| 2001/0051980 A1 | 12/2001 | Raciborski et al. | |
| 2002/0065932 A1* | 5/2002 | Kobayashi | G06F 17/30902 709/233 |
| 2002/0163882 A1* | 11/2002 | Bornstein | G06F 11/2007 370/225 |
| 2004/0249971 A1 | 12/2004 | Klinker et al. | |
| 2008/0317043 A1 | 12/2008 | Dougherty et al. | |
| 2009/0077173 A1* | 3/2009 | Lowery | H04L 47/10 709/203 |
| 2009/0282159 A1* | 11/2009 | Wang | H04L 61/609 709/231 |
| 2011/0103374 A1 | 5/2011 | Lajoie et al. | |
| 2011/0231475 A1 | 9/2011 | Van Der Merwe et al. | |
| 2012/0042367 A1* | 2/2012 | Papakostas | H04L 63/0281 726/7 |
| 2013/0286846 A1* | 10/2013 | Atlas | H04L 45/34 370/236 |
| 2013/0290544 A1* | 10/2013 | Kohli | H04L 63/0281 709/226 |

(Continued)

FOREIGN PATENT DOCUMENTS

WO  WO02071242 A1  9/2002

*Primary Examiner* — Wing F Chan
*Assistant Examiner* — Billy H Ng (57) ABSTRACT

Systems and methods of operating a content node that caches digital content for end users are provided herein. The content node is configured to cache data. When the content node receives a request for content that is not presently cached, the content node identifies the origin server associated with the requested content. The content node monitors network characteristics for at least the origin server and one or more service providers that transfer content between the origin server and the content node. The content node selects a network address associated with a particular service provider based upon network characteristics and requests the origin server to deliver requested content and the selected address.

8 Claims, 8 Drawing Sheets

(56) References Cited

U.S. PATENT DOCUMENTS

| | | | | |
|---|---|---|---|---|
| 2014/0082212 A1* | 3/2014 | Garg | ................ | H04N 21/23439 709/233 |
| 2015/0113166 A1* | 4/2015 | Mosko | .................... | H04L 45/14 709/242 |
| 2015/0127837 A1* | 5/2015 | Harashima | ............ | H04L 67/327 709/227 |

* cited by examiner

RETURN PATH SELECTION FOR CONTENT DELIVERY

RELATED APPLICATIONS

This application claims the benefit of U.S. Provisional Application Ser. No. 61/912,914, filed on Dec. 6, 2013, and entitled "RETURN PATH SELECTION FOR CONTENT DELIVERY," which is hereby incorporated by reference in its entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery networks have been developed which add a layer of caching between origin servers of the content providers and the end users. The content delivery networks typically have one or more content nodes distributed across a large geographic region to provide faster and lower latency access to the content for the end users. When end users request content, such as a web page, which is handled through a content node, the content node is configured to respond to the end user requests instead of the origin servers. In this manner, a content node can act as a proxy for the origin servers. However, when a content node communicates over different communication carriers, the various ISPs and other packet networks over which end user content requests and content delivery are handled can add additional slowdowns and latency issues.

OVERVIEW

Systems and methods of operating a content node that caches digital content for end users are provided herein. The content node is configured to cache data. When the content node receives a request for content that is not presently cached, the content node identifies the origin server associated with the requested content. The content node monitors network characteristics for at least the origin server and one or more service providers that transfer content between the origin server and the content node. The content node selects a network address associated with a particular service provider based upon network characteristics and requests the origin server to deliver requested content and the selected address.

DETAILED DESCRIPTION

Network content, such as web page content, typically includes content such as text, hypertext markup language (HTML) pages, pictures, video, audio, code, scripts, or other content viewable by an end user in a browser or other application. This various network content can be cached by content nodes of a content delivery network. The network content includes example website content referenced in FIG. 1, such as "www.gamma.gov," "www.alpha.com," and "www.beta.net," among others. When a content delivery network is employed, the content delivery network can act as a proxy to cache content delivery between origin servers and the end user devices.

The content delivery networks typically have one or more content nodes distributed across a large geographic region to provide faster and lower latency local access to the content for the end users. When end users request content, such as a web page, a locally proximate content node will respond to the content request instead of the associated origin server. If the requested content is not already cached, the content node retrieves it from an origin server.

Figure 1:
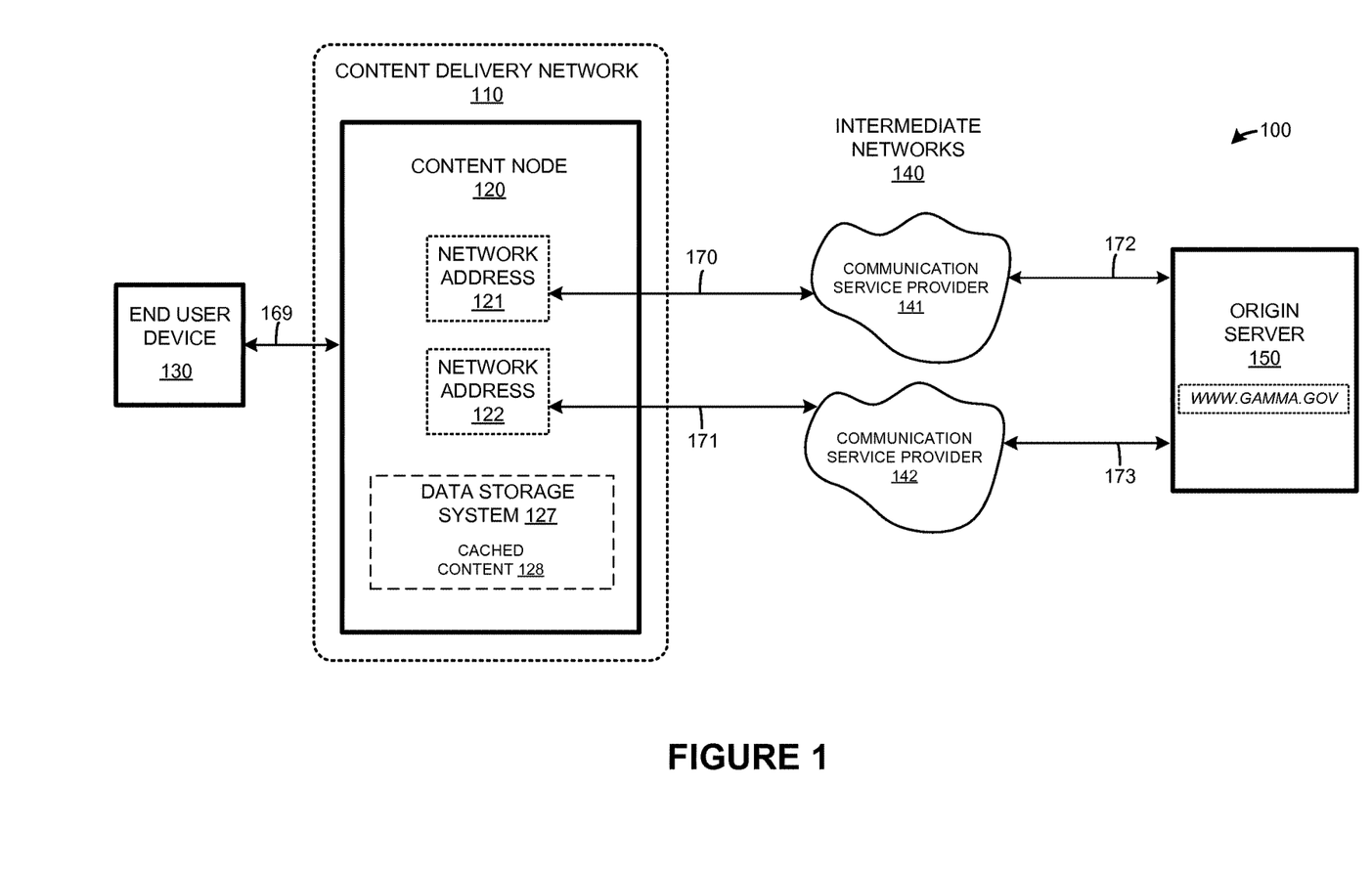
FIG. 1 is a system diagram illustrating a communication system.

FIG. 1 is a system diagram illustrating communication system 100. Communication system 100 includes content delivery network (CDN) 110, at least one end user device 130, intermediate networks 140, at least one origin server 150, and network links 169-173.

Content delivery network 110 includes one or more content nodes (CN) such as CN 120. CDN 110 can be distributed over many geographic locations over a geographic area, and include multiple CNs in each geographic location. Content delivery network 110 includes one or more content nodes for caching and distribution of content to end users.

CN 120 includes a plurality of network addresses 121-122 and data storage system 127. Data storage system 127 is capable of storing cached content 128. Although only one CN is shown in FIG. 1, it should be understood that many CNs can be included in content delivery network 110, with the CNs distributed over a geographic area.

Content node 120 can include communication interfaces, network interfaces, processing systems, computer systems, microprocessors, storage systems, storage media, or some other processing devices or software systems, and can be distributed among multiple devices. Examples of content node 120 can include software such as an operating system, logs, databases, utilities, drivers, networking software, and other software stored on a computer-readable medium.

End user device 130 is representative of a device that can request and receive network content. End user device 130 comprises a computer, cellular telephone, wireless transceiver, digital assistant, Internet appliance, or some other communication apparatus. Any number of end user devices 130 can make content requests to the one or more content nodes, such as CN 120. CN 120 communicates with end user device 130 over network link 169.

Origin server 150 is representative of a device that can store and transfer network content. Origin server 150 can include communication interfaces, network interfaces, processing systems, computer systems, microprocessors, storage systems, storage media, or some other processing devices or software systems, and can be distributed among multiple devices. Examples of origin server 150 can include software such as an operating system, logs, databases, utilities, drivers, networking software, and other software stored on a computer-readable medium.

Network link 169 can include any number of links and networks, and is representative of a communication path between content node 120 and end user device 130. Network link 169 can use the Internet protocol, Ethernet, telephony, or some other communication protocol, including combinations thereof. Network link 169 uses wireless links, metallic links, optical links, or some other communication link, including combinations thereof. Network link 169 comprises the Internet, a private network, a telephone network, or some other communications network.

Intermediate networks 140 include at least communication service provider 141 and communication service provider 142. These communication service providers can provide communication pathways for routing traffic between various endpoints. The communication service providers typically include one or more packet networks, and in some examples include the Internet.

Network links 170-173 use Internet protocol, Ethernet, telephony, or some other communication protocol, including combinations thereof. Network links 170-173 use wireless links, metallic links, optical links, or some other communication link, including combinations thereof. Network links 170-173 comprise the Internet, a private network, a telephone network, or some other communications network.

Figure 2:
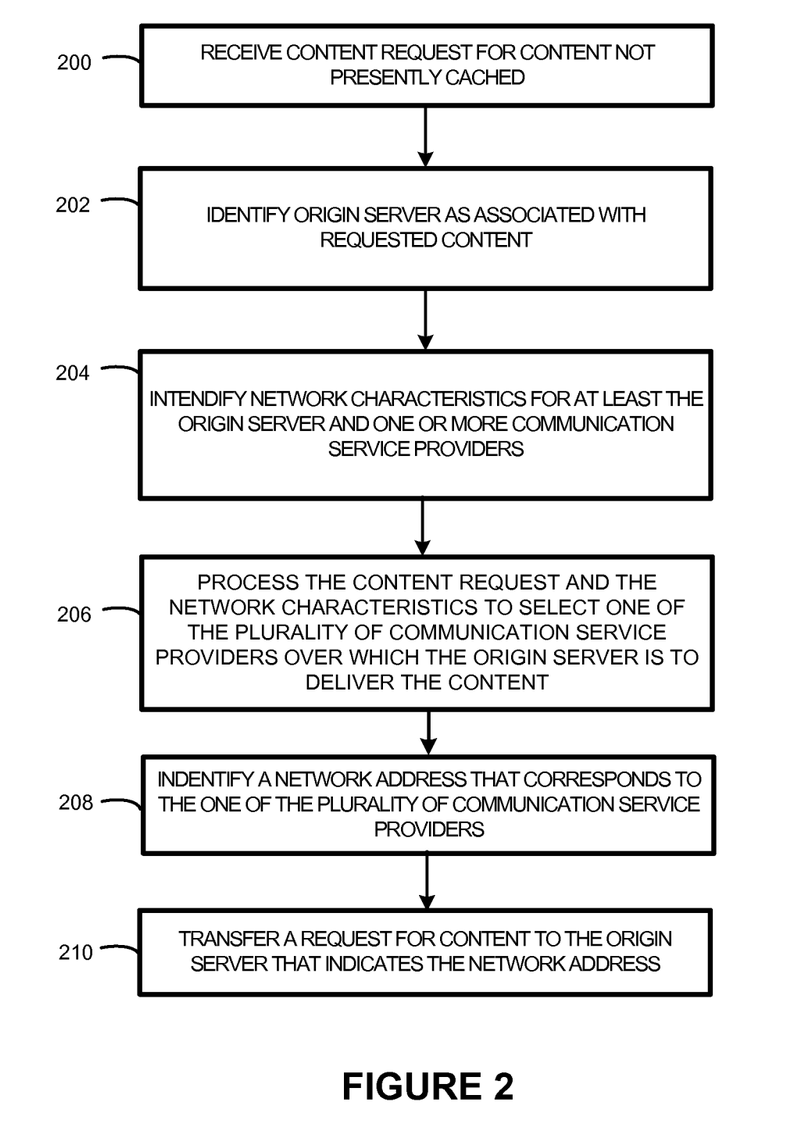
FIG. 2 is a flow diagram illustrating a method of operating a content node.

FIG. 2 illustrates a flow diagram describing a method of operating a communication system, such as communication system 100 of FIG. 1, to select between network addresses 121, 122 based upon network characteristics. The operations of FIG. 2 are referenced parenthetically in the description below.

Content node 120 receives a content request (200) for content not presently cached. Content node 120 identifies origin server as associate with requested content (202). Content node 120 identifies network characteristics for at least origin server 150 and one or more communication service providers 141, 142 (204). Content node 120 processes the content request and the network characteristics to select one of the pluralities of communication service providers 141, 142 over which origin server 150 is to deliver the content (206). Content node 120 identifies a network address that corresponds to the one of the plurality of communication service providers 141, 142 (208). Content node 120 transfers a request for content to origin server 150 that indicates network address 121,122 (210).

Figure 3:
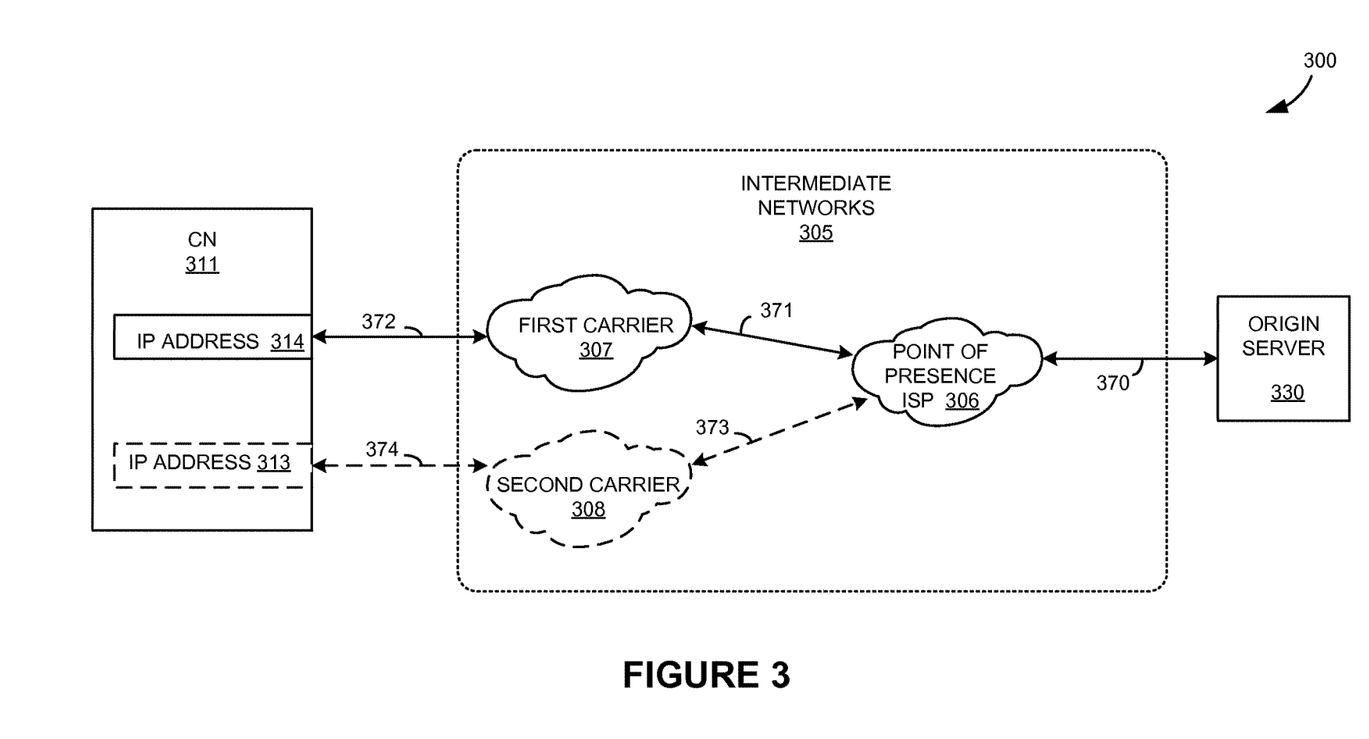
FIG. 3 is a system diagram illustrating a communication system.

FIG. 3 is a system diagram illustrating communication system 300. Communication system 300 includes intermediate networks 305, content node 311, and origin server 330. Content node 311 includes at least IP addresses 313-314. Elements of intermediate networks 305 are configured such that a content request from content node 311 and a content response from origin server 330 pass through ISP 306 and one of network carriers 307-308. In this example, the network addresses of content node 311 are Internet protocol (IP) addresses 313-314. Content node 311 transfers content requests over either network link 372 or 374 depending on which carrier 307 or 308 carries the selected IP address. Network links 370-374 use Internet protocol, Ethernet, telephony, or some other communication protocol, including combinations thereof. Network links 370-374 use wireless links, metallic links, optical links, or some other communication link, including combinations thereof. Network links 370-374 comprise the Internet, a private network, a telephone network, or some other communications network.

Content node 311 may load balance between carriers 307-308 by selecting one of IP addresses 313-314 according to operating conditions. In this example, the fastest route between content node 311 and origin server 330 passes through first carrier 307, since first carrier 307 momentarily has less latency than second carrier 308. As such content node 311 momentarily prefers first carrier 307, and consequentially content node 311 prefers using IP address 314. However network link 372 may become saturated or otherwise degraded, thereby increasing the latency of first carrier 307. As such, any preference content node 311 has to route over a given ISP may change when network performance data changes.

When selecting an IP address, content node 311 may process network or communication status data such as outages, price schedules, and network performance issues with causes such as buffer saturation, packet window not tuned, page swap, disk wait, packet loss, bottleneck, and congestion. While processing, content node 311 may consider performance constraints of network links 370-374, perhaps including latency measured with Internet control message protocol (ICMP) pings or with actual delivery times for content-related traffic as measured by content node 311. The properties of origin server 330 may also be processed by content node 311. For example the IP address of an end user device can be associated with a range of IP addresses that are showing poor performance such as high latency.

Content node 311 may receive and process network performance data in real time. This encourages content node 311 to take control and make dynamic routing decisions. For example carriers 307-308 may usually more or less equally share the traffic of content requests going to content node 311. Content node 311 can select network addresses 313, 314 in real-time by repeatedly applying network address selection criteria. By repeatedly applying its network address selection criteria to the most recent network performance data, content node 311 may tune the routing of content to better fit current conditions.

In this example content node 311 attempts to retrieve two pieces of content that are both stored at origin server 330. Content node 311 selects IP address 314 to reach origin server 330. Content requests directed to IP address 314 go through first carrier 307. If first carrier 307 begins to show signs of operational stress, including failures to meet quality thresholds, content node 311 may more or less shift traffic from first carrier 307 to second carrier 308. Content node 311 achieves this shift by curtailing or discontinuing the use of IP address 314 and increasing the use of IP address 313. The dashed lines of FIG. 3 indicate the path for traffic when second carrier 308 becomes the fastest route between origin server 330 and CN 311. By deciding routing and selecting IP addresses, content node 311 can shape traffic in real time according to cost and quality constraints.

Figure 4:
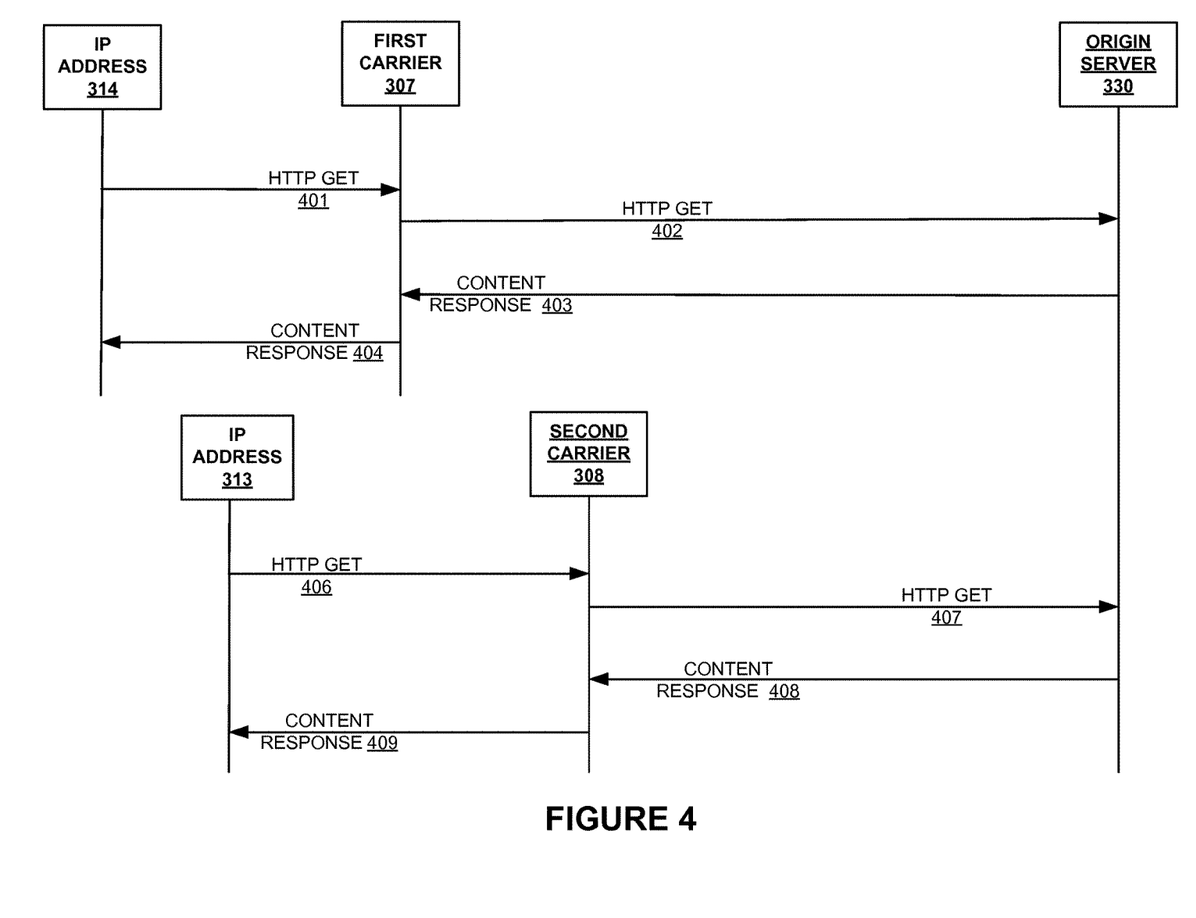
FIG. 4 is a sequence diagram illustrating an example method of operating a communication system.

FIG. 4 is a sequence diagram illustrating a method of operating FIG. 3. It should be understood that the operations of FIG. 4 can also be applied to similar elements of FIG. 1. Elements shown in FIG. 4 operate to select and use network addresses in communication system 300. The communication system 100 of FIG. 1 may also perform the behavior shown in FIG. 4.

During operation, content node 311 attempts to retrieve content from origin server 330. Content node 311 prefers using IP address 314 for content requests. According to the network characteristics of origin server 330 and the various carriers 307-308 available, content node 311 determines that first carrier 307 is currently desirable and selects IP address 314 that will reach origin server 330 through that network carrier. Content node 311 begins to request content by first delivering an HTTP GET (401-402) to origin server 330. Content node 311 receives content response (403-404) that also passes through first carrier 307. During saturation or other performance degradation beyond a performance threshold of first carrier 307, content node 311 shifts some or all content requests to IP address 313. When IP address 313 is used, HTTP GET (406-407) and content responses (408-409) are routed through second carrier 308.

Figure 5:
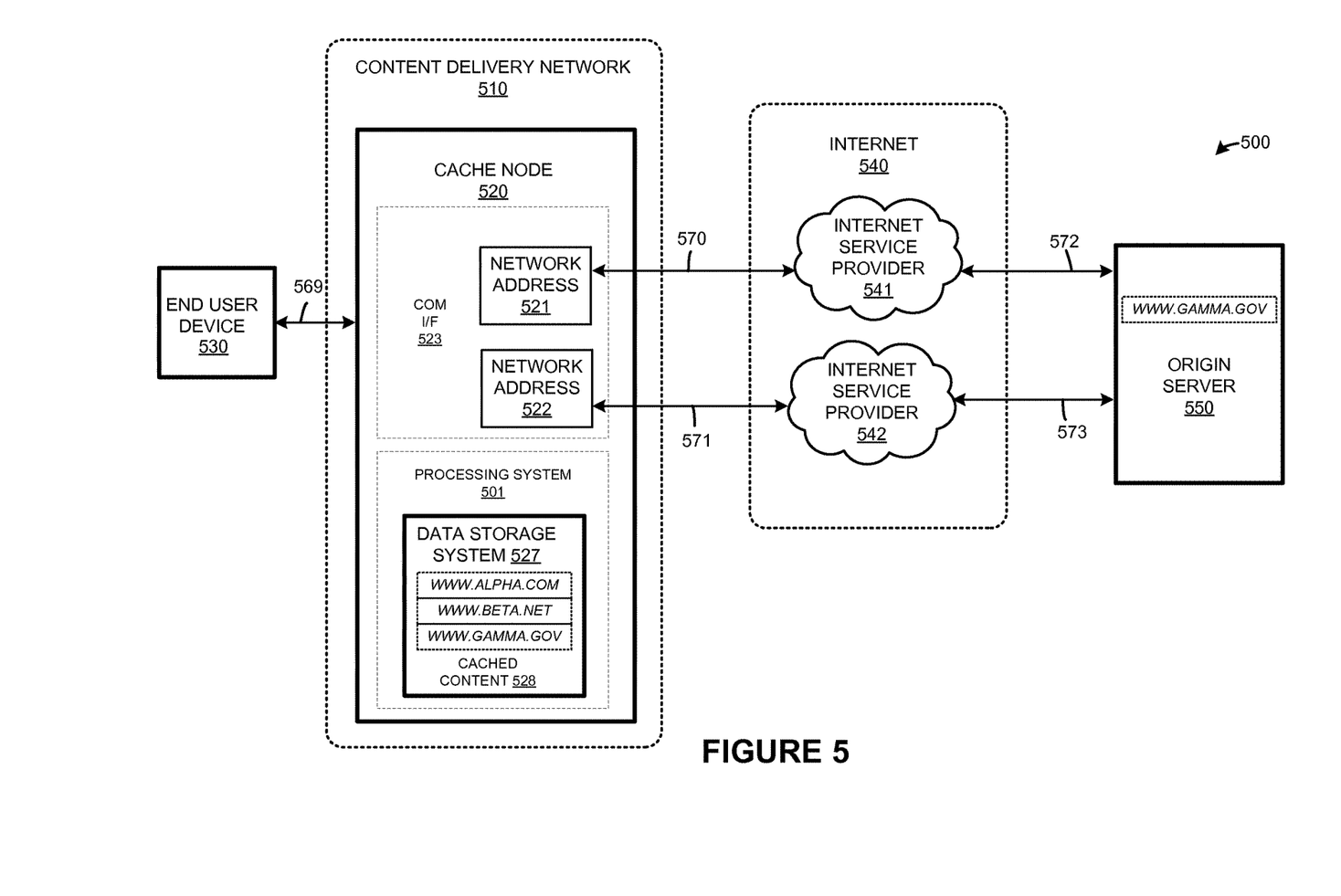
FIG. 5 is a system diagram illustrating a communication system.

FIG. 5 is a system diagram illustrating communication system 500. Communication system 500 includes content delivery network (CDN) 510, at least one end user device 530, the Internet 540, at least one origin server 550, and network links 569-573.

Content delivery network 510 includes one or more cache nodes such as cache node 520. Cache node 520 includes communication interface 523 and processing system 501. Communication interface 523 includes at least network addresses 521-522. Processing system 501 includes data storage system 527. Data storage system 527 is capable of storing cached content 528. Although only one cache node is shown in FIG. 5, it should be understood that many cache nodes can be included in content delivery network 510, with the cache nodes distributed over a geographic area.

End user device 530 is representative of a device that can request and receive network content. End user device 530 comprises a computer, cellular telephone, wireless transceiver, digital assistant, Internet appliance, or some other communication apparatus. Any number of end user devices 530 can make content requests to the one or more cache nodes, such as cache node 520. Cache node 520 communicates with end user device 530 over network link 569.

Network link 569 can include any number of links and networks, and is representative of a communication path between cache node 520 and end user device 530. Network link 569 can use the Internet protocol, Ethernet, telephony, or some other communication protocol, including combinations thereof. Network link 569 uses wireless links, metallic links, optical links, or some other communication link, including combinations thereof. Network link 569 comprises the Internet, a private network, a telephone network, or some other communications network.

The Internet 540 includes at least Internet service provider 541 and Internet service provider 542. These Internet service providers 541-542 can provide communication pathways for routing traffic between various endpoints.

Network links 570-573 use Internet protocol, Ethernet, telephony, or some other communication protocol, including combinations thereof. Network links 570-573 use wireless links, metallic links, optical links, or some other communication link, including combinations thereof. Network links 570-573 comprise the Internet, a private network, a telephone network, or some other communications network.

Figure 6:
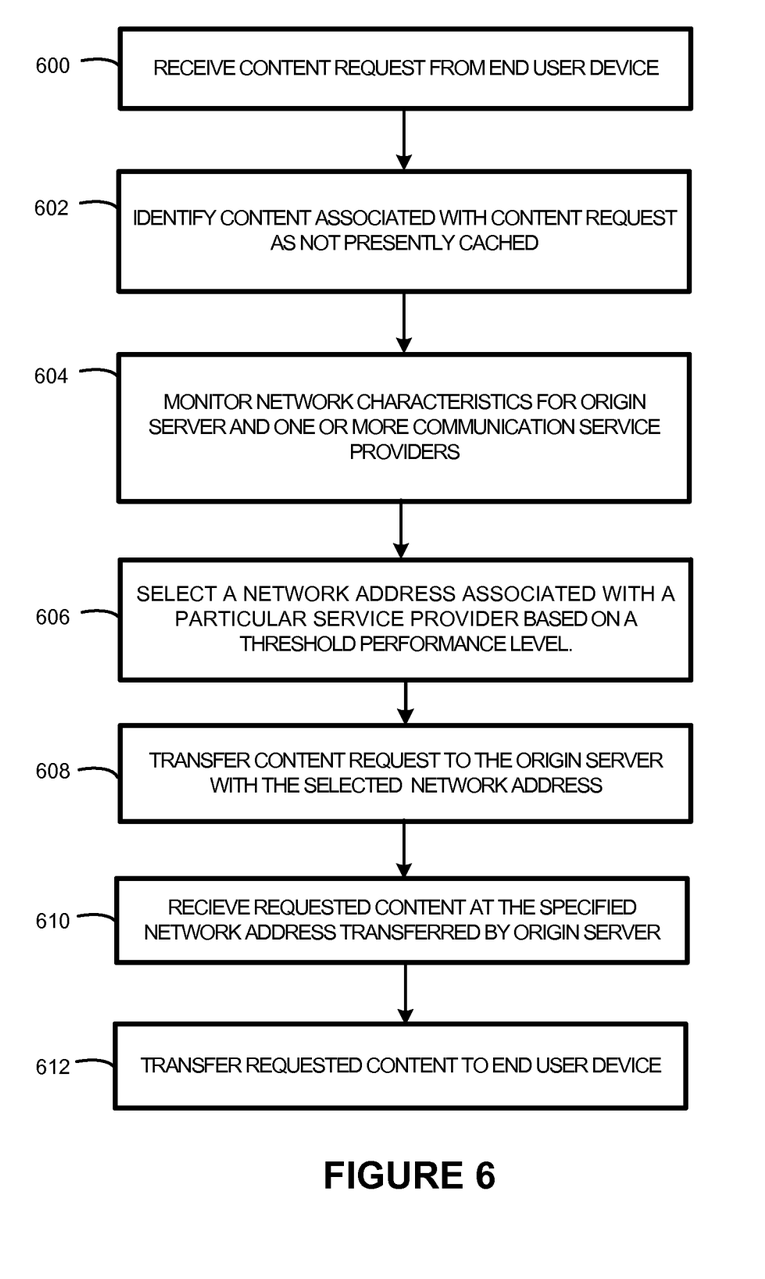
FIG. 6 is a block diagram illustrating a content node.

FIG. 6 illustrates a flow diagram describing a method of operating a communication system, such as communication system 500 of FIG. 5 to select between network addresses 521, 522 based upon network characteristics. This method of operating a communication system can also be applied to communication system 100 of FIG. 1. The operations of FIG. 6 are referenced parenthetically in the description below.

Cache node 520 receives a content request (600) from end user device 530 over network link 569. The requested content may or may not already be stored or cached by content node 520. If the content node identifies that the content associated with the content request is not presently cached, then the content node 520 must request the content from an origin server, such as origin server 550.

Content node 520 monitors network characteristics for origin server 550 and communication service providers 541 and 542 (604). Before content node 520 requests content from origin server 550, content node 520 selects network address 521 or 522 by which content node 520 should receive the requested content from origin server 550 (606). Content node 520 selects the network address by at least processing the content request and the network characteristics for communication service providers 541, 542, as well as for origin server 550 and any associated network links 570-573.

Content node 520 and origin server 550 can communicate with each other through any of communication service providers 541-542. Content node 520 selects either network address 521 or network address 522 as the address for receiving content transferred by origin server 550 based upon network characteristics (604). While FIG. 5 only illustrates two network addresses 521-522 and two communication service providers 541-542, it should be appreciated that a large number of network addresses 521-522 and communication service providers 541-542 may be used. Although content node 520 can receive requested content at either network address 521 or 522, a content response from origin server 550 that is delivered to network address 521 is transferred through a different communication service provider than a content response from origin server 550 that is delivered to network address 522. Content node 520 identifies and processes the network characteristics of at least communications service providers 541-542 (604), and thus content node 520 may select either of network addresses 521 and 522. This selection can depend on which communication service provider currently has more desirable network characteristics, such as high throughput or low latency, among other considerations. Content node 520 can select a network address 521, 522 in real time by repeatedly applying network address selection criteria. Content node 520 is configured to analyze network performance of the plurality of communication service providers 541,542 and select network addresses 521, 522 to load balance incoming data streams.

After selecting a network address 521, 522 (606), content node 520 transfers a content request along with the selected network address to origin server 550 (608). The content request is transferred to origin server 550 over whichever of communication service providers 541-542 is associated with the selected network address (608). For example, communications transferred by content node 520 using network address 521 are routed over communication service provider 541 to reach origin server 550, while communications transferred by content node 520 using network address 522 are routed over communication service provider 542. In other examples, the network address 521, 522 used to issue the origin content request to origin server 550 is unrelated to the communication server provider that the origin content request is transferred over, and the origin content request indicates a source address as the selected network address 521-522.

Origin server 550 transfers a response to the previously selected network address 521,522 in the content node 520 that includes the requested content, responsive to the content request (608). Content node 520 then receives the requested content at the selected network address 521, 522 (610). After the requested content arrives from origin server 550, content node 520 delivers the requested content to end user device 530 (612). For example, if the content requested is associated with www.gamma.gov, then content node 520 can retrieve origin content associated with www.gamma.gov from origin server 550, cache this content in data storage system 527 of content node 520, and send at least some content of www.gamma.gov for delivery to end user device 530.

Figure 7:
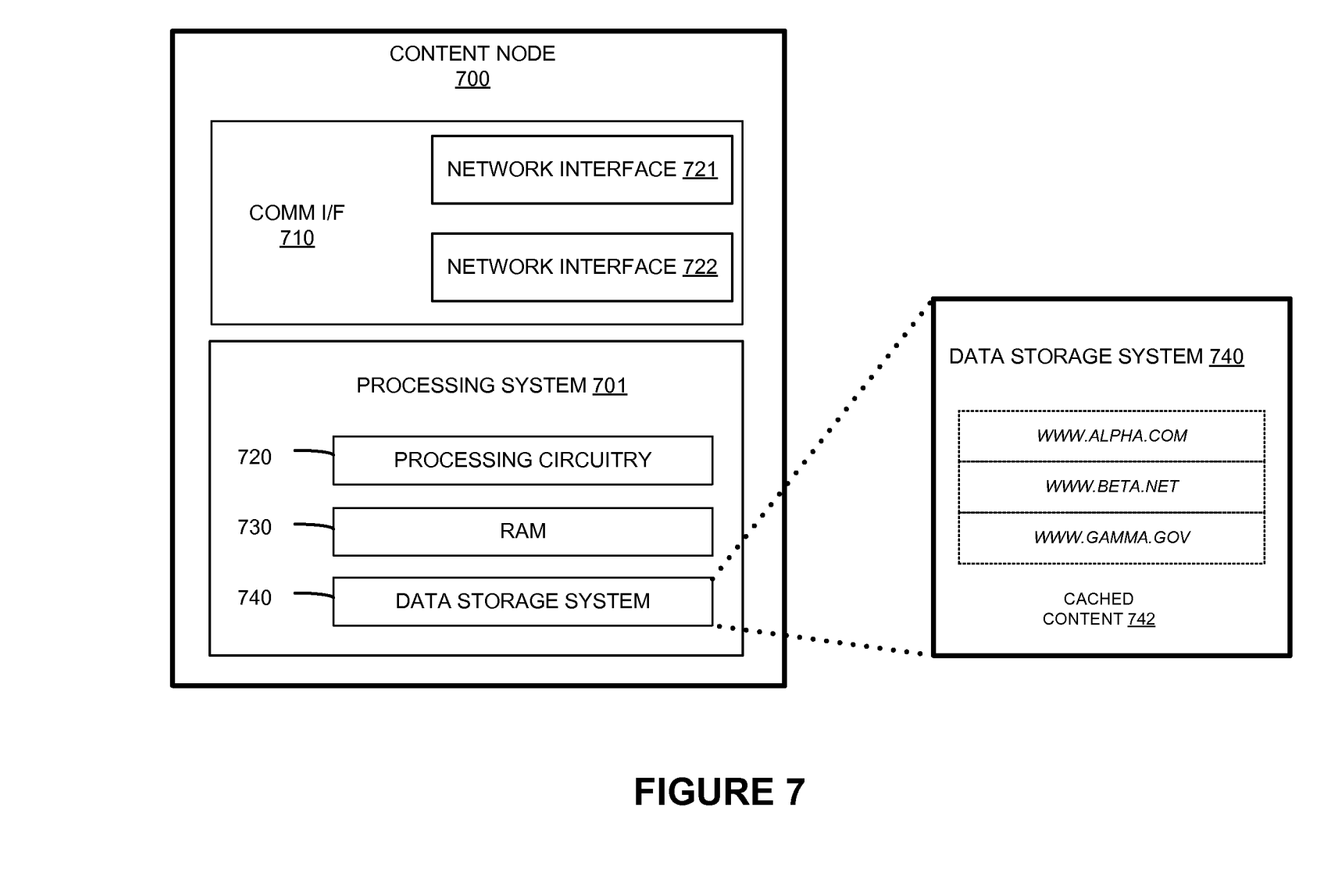
FIG. 7 is a system diagram illustrating a communication system.

FIG. 7 illustrates the internal configuration of content node 700. Content node 700 can be an implementation of content node 120 in FIG. 1, cache node 520 in FIG. 5, or content nodes 811-813 in FIG. 8, although variations are possible. Content node 700 includes communication interface 710 and processing system 701. Communication interface 710 includes at least network address 721 and network address 722. Processing system 701 includes processing circuitry 720, Random Access Memory (RAM) 730, and data storage system 740. Data storage system 740 is capable of storing cached content 742.

In operation, processing system 701 is operatively linked to communication interface 710, RAM 730, and storage 740 by processing circuitry 720. Processing system 701 is capable of executing software stored in RAM 730 or storage 740. When executing the software, processing system 701 drives content node 700 to operate as described herein. Content node 700 can also include other elements, such as user interfaces, computer systems, databases, distributed storage and processing elements, and the like.

Processing system 701 can be implemented within a single processing device but can also be distributed across multiple processing devices or sub-systems that cooperate in executing program instructions. Examples of processing system 701 include general purpose central processing units, microprocessors, application specific processors, and logic devices, as well as any other type of processing device. In some examples, processing system 701 includes physically distributed processing devices, such as cloud computing systems.

Communication interface 710 includes one or more network interfaces 721-722 for communicating over communication networks, such as packet networks, the Internet, and the like. Network interfaces 721-722 can include one or more local or wide area network communication interfaces which can communicate over Ethernet or Internet protocol (IP) links. Communication interface 710 can include network interfaces configured to communicate using one or more network addresses, which can be associated with different network links. Examples of communication interface 710 include network interface card equipment, transceivers, modems, and other communication circuitry.

RAM 730 and storage 740 together can comprise data storage system 740 for storage of cached content 742, although variations are possible. RAM 730 and data storage system 740 can each comprise any non-transitory storage media readable by processing system 701 and capable of storing software. RAM 730 can include volatile and non-volatile, removable and non-removable media implemented in any method or technology for storage of information, such as computer readable instructions, data structures, program modules, or other data. Storage 740 can include non-volatile storage media, such as solid state storage media, flash memory, or solid state storage system. RAM 730 and storage 740 can each be implemented as a single storage device but can also be implemented across multiple storage devices or sub-systems. RAM 730 and storage 740 can each comprise additional elements, such as controllers, capable of communicating with processing system 701.

Software stored on or in RAM 730 or storage 740 can comprise computer program instructions, firmware, or some other form of machine-readable processing instructions having processes that when executed by processing system 701 direct content node 700 to operate as described herein. For example, software drives content node 700 to receive requests for content, determine if the content is stored in content node 700, retrieve content from origin servers, transfer content to end user devices, manage data storage systems for handling and storing the content, request portions of video or media content from origin servers, and transmux portions of video data, among other operations. The software can also include user software applications. The software can be implemented as a single application or as multiple applications. In general, the software can, when loaded into processing system 701 and executed, transform processing system 701 from a general-purpose device into a special-purpose device customized as described herein.

Figure 8:
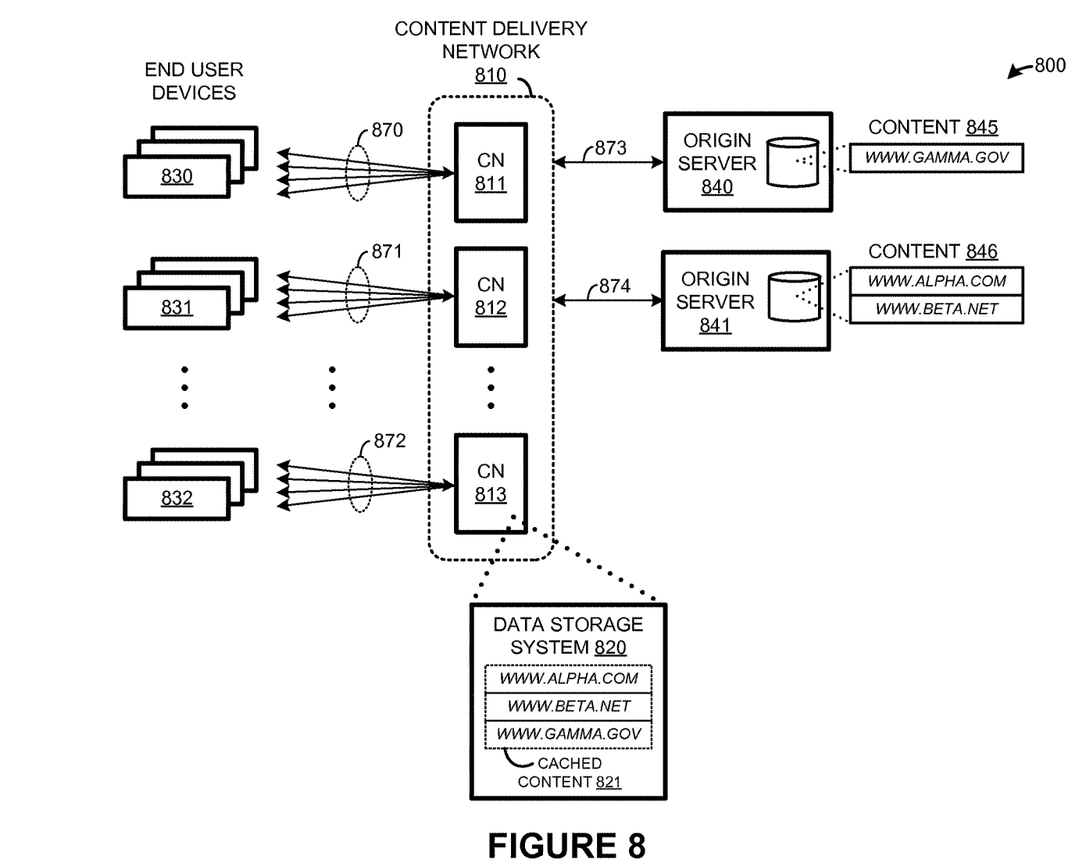
FIG. 8 is a system diagram illustrating a communication system.

FIG. 8 is a system diagram illustrating communication system 800 as an example of a content delivery network 810 that employs more than one content node (CN) 811-813. Communication system 800 includes content delivery network 810, end user devices 830-832, and origin servers 840-841. Content delivery network 810 includes one or more content nodes (CN) 811-813. It should be understood that content nodes 811-813 can be examples of content node 120, cache node 520, or content node 600. Each of CN 811-813 can include one or more data storage systems, such as data storage system 820 of CN 813. End user devices 830-832 are representative of a plurality of end user devices which can request and receive network content, and any number of end user devices 830-832 can be associated with each of content nodes 811-813. CN 811-813 and one of end users 830-832 communicate over associated network links 870-872. Content delivery network 810 and origin servers 840-841 communicate over associated network links 873-874. Although not shown in FIG. 8 for clarity, each of CN 811-813 can also communicate with each other over network links.

To further illustrate FIG. 8, a brief description of the operation of communication system 800 is included. In operation, end user devices 830-832 request network content, such as content 845-846 associated with origin servers 840-841. Instead of these requests being handled by the individual origin servers 840-841, individual content nodes 811-813 of content delivery network 810 receive the content requests over ones of links 870-872 and processes the content requests for delivery of the content to the associated end user devices 830-832. Requested network content that is already stored in ones of CN 811-813 can be provided quickly to the end user devices, while network content that is not already stored in ones of CN 811-813 can be responsively requested by an associated one of CN 811-813 from an appropriate origin server 840-841 for delivery by the CN and possible caching by the CN. In this manner, each of CN 811-813 can act as intermediary proxy nodes to provide local and fast access for end user devices 830-832 to network content of origin servers 840-841 without burdening origin servers 840-841. For example, CN 813 includes cached content 821, which can include portions of any of the content originated at origin servers 840-841.

CN 811-813 and origin servers 840-841 can each include communication interfaces, network interfaces, processing systems, computer systems, microprocessors, storage systems, storage media, or some other processing devices or software systems, and can be distributed among multiple devices. Examples of CN 811-813 and origin servers 840-841 can each include software such as an operating system, logs, databases, utilities, drivers, networking software, and other software stored on a computer-readable medium. Content delivery network 810, in addition to including CN 811-813, can include equipment and links to route communications between CN 811-813 and any of end user devices 830-832, and origin servers 840-841, among other operations.

End user devices 830-832 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 870-874 each use metal, glass, optical, air, space, or some other material as the transport media. Communication links 870-874 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 870-874 can each be a direct link or can include intermediate networks, systems, or devices, and can include a logical network link transported over multiple physical links. Although one main link for each of links 870-874 is shown in FIG. 8, it should be understood that links 870-874 are merely illustrative to show communication modes or access pathways. In other examples, further links can be shown, with portions of the further links shared and used for different communication sessions or different content types, among other configurations. Communication links 870-874 can each include many different signals sharing the same associated link, as represented by the associated lines in FIG. 8, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a content node that caches digital content for delivery to end users, the method comprising:
   receiving a content request in the content node for content not presently cached by the content node;
   identifying an origin server associated with the content and identifying network characteristics for at least the origin server and one or of a plurality of communication service providers that transport communications between the content node and the origin server, the network characteristics comprising a latency measure measured with one or more Internet Control Message Protocol (ICMP) pings;
   identifying a plurality of network addresses of the content node, at least two of the plurality of network addresses each associated with a different one or more of the plurality of communication service providers;
   repeatedly processing the content request and the network characteristics to select, in real-time, a first or a second communication service provider of the plurality of communication service providers, associated with a first or a second network address of the plurality of network addresses, respectively, over which the origin server is to deliver the content to the content node; and
   transferring a request for the content for delivery to the origin server that indicates the first or second network address, associated with the selected one of the first or second communication service provider.

2. The method of claim 1, further comprising:
   analyzing network performance of the communication service providers and selecting between the plurality of communication service providers to load balance incoming data streams.

3. The method of claim 1, further comprising:
   identifying when network performance at a former network address of the plurality of network addresses falls below a threshold performance level and responsively select the first communication service provider, associated with the first network address, wherein the first network address has a performance that exceeds the threshold performance level.

4. The method of claim 1, further comprising:
   responsive to the request for the content transferred to the origin server, receiving the content over the selected content service provider of the plurality of content service providers and caching the content in the content node.

5. A content node that caches digital content for delivery to end users, the content node comprising:
   a communication interface configured to receive a content request in the content node for content not presently cached by the content node;
   one or more processors configured to identify an origin server associated with the content and identify network characteristics for at least the origin server and one or more of a plurality of communication service providers that transport communications between the content node and the origin server, the network characteristics comprising a latency measure measured with one or more Internet Control Message Protocol (ICMP) pings;
   a plurality of network addresses of the content node, at least two of the plurality of network addresses each associated with a different one or more of the plurality of communication service providers;
   the one or more processors configured to repeatedly process the content request and the network characteristics to select, in real-time, a first or second communication service provider of the plurality of communication service providers over which the origin server is to deliver the content to the content node, associated with a first or second network address of the plurality of network addresses that corresponds to the first or second of the plurality of communication service providers, respectively; and
   the communication interface configured to transfer a request for the content for delivery to the origin server that indicates the first or second network address, associated with the selected one of the first or second content service provider, respectively.

6. The content node of claim 5, comprising:

the one or more processors configured to analyze network performance of the plurality of communication service providers and select between the plurality of network addresses to load balance incoming data streams.

7. The content node of claim 5, comprising:

the one or more processors configured to identify when network performance at a former network address falls below a threshold performance level and responsively select the first communication service provider, associated with the first network address, wherein the first network address has a performance that exceeds the threshold performance level.

8. The content node of claim 5, wherein the communication interface comprises a plurality of network interfaces associated with the plurality of network addresses.

\* \* \* \* \*